Sept. 2, 1969

A. W. BARBER 3,465,246

COMBINED REFERENCE VOLTAGE SOURCE AND COMPARISON
VOLTMETER WITH DIGITAL INDICATOR
Filed June 30, 1966

INVENTOR.

Alfred W. Barber

United States Patent Office 3,465,246
Patented Sept. 2, 1969

3,465,246
COMBINED REFERENCE VOLTAGE SOURCE AND COMPARISON VOLTMETER WITH DIGITAL INDICATOR
Alfred W. Barber, Bayside, N.Y.
(32—44 Francis Lewis Blvd., Flushing, N.Y. 11358)
Filed June 30, 1966, Ser. No. 561,804
Int. Cl. G01r 17/02
U.S. Cl. 324—98
6 Claims

ABSTRACT OF THE DISCLOSURE

A regulated voltage is programmed by means of a digital indicating potentiometer to provide a accurately known reference voltage. Alternately an unknown voltage is measured by comparison with the digitally indicated reference voltage. The device presents a very high impedance to unknown voltages when used as a voltmeter and is insensitive to loading when used as a voltage source.

---

The present invention concerns programmable DC reference voltage sources with digital indication and digital voltmeters.

Reference voltage sources have been provided in which the voltage control resistor of an operational amplifier is varied to provide a programmed output voltage. This control resistor is usually arranged in decades which are controlled by switches with digital indicating dials. Such an arrangement can be made to cover a wide range of voltage with a high degree of accuracy usually 0.01 to 0.0001 percent. However, these reference standards are expensive and their use is limited to those who can afford them.

The present invention concerns a programmable reference voltage which is simple and inexpensive and yet one which includes a digital indicator and a moderate degree of accuracy of the order of 0.1 percent. I provide a regulated voltage say 11 volts by means of a Zener diode and a highly linear 10 turn potentiometer with a digital dial. The voltage across the potentiometer is set accurately to 10 volts by means of an adjustable resistor between it and the regulated voltage across the Zener diode. Thus I provide an output reference voltage adjustable from zero to 10 volts which is directly read on the digital dial to three places.

While the digitally programmed reference voltage source is a very useful device, I have discovered a way to add a very important function in an exceedingly simple and inexpensive manner. I have added a pair of transistors and an inexpensive meter similar to those used for tuning meters in FM receivers and provided a digital voltmeter. An unknown voltage is applied to the base of one of the transistors and the programmed reference voltage to the base of the other transistor. The meter is connected between the transistor collectors. To use this digital voltmeter, the unknown voltage is connected and the reference voltage dial is rotated until the meter indicates equality between the two voltages. The unknown voltage is then read directly on the digital dial. The meter is connected so that it reads to the left of center when the reference voltage is less than the unknown voltage and the right of center when the reference voltage is greater than the unknown. This shows which direction the dial is to be rotated to produce equality i.e. the dial is rotated clockwise to cause the meter reading to increase clockwise toward center and vice versa.

As briefly described above, I have provided a simple, inexpensive and moderately accurate programmable digitally indicated reference voltage and digital voltmeter which should fill a wide need for such devices. As a digital voltmeter two transistors connected as a long-tailed pair with the zero center balance indicating meter connected between their collectors provides a sensitive balance indicating circuit. The addition of Darlington drivers to the long-tailed pair provides a circuit which draws only an extremely small current from the reference potentiometer and from the unknown voltage source. Typically this current is less than 1 microampere.

As a source of digitally programmed source of reference voltage the transistor circuits are switched to act as emitter followers so that they become impedance transformers. The output reference voltage is taken off between the two emitters and provide a very much better regulated output voltage than can be obtained directly from the reference potentiometer. Typically a load of 100,000 ohms on this emitter follower output circuit causes less change in the actual output voltage than 5,000,000 ohms would if directly connected to the potentiometer an improvement of over 50 to 1 or, in other words, a 50 to 1 reduction in internal impedance of the voltage source. At the same time the current drawn from the potentiometer is less than 1 microampere which causes less than 0.1 percent error in output voltage at most.

Accordingly, the object of the present invention is to provide a simple, inexpensive digital device which by means of a simple switching circuit is connected either as a digital voltmeter or as a source of digitally programmed reference voltage.

This and other objects will be clear from the detailed description of the invention given in connection with the figures of the drawing.

Figure 1:
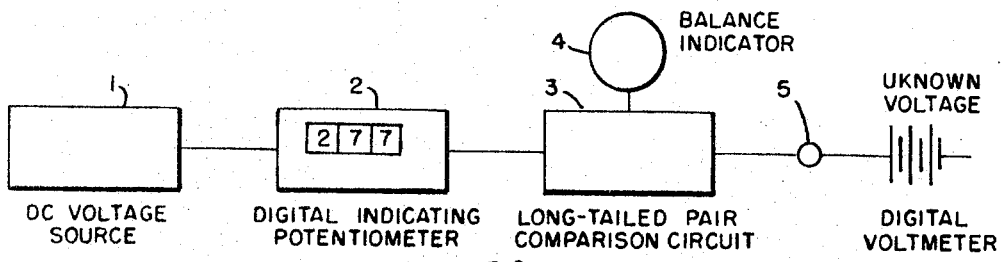
FIGURE 1 is a block diagram of the present invention connected as a digital voltmeter.

In FIGURE 1 the digital voltmeter consists of a source of DC voltage 1 which is highly regulated and applied to a precision potentiometer 2 having a digital dial. The programmed voltage, read directly on the digital dial, is applied to a comparator 3 consisting of a long-tailed transistor pair. The unknown voltage to be measured is also applied to comparator 3 by connecting it to input terminal 5. Balance, i.e. equality between the programmed reference voltage and the unknown external voltage is indicated on a zero-center meter 4. When balance is attained by varying the potentiometer setting until meter 4 reads zero, the unknown voltage is read directly on the digital dial.

Figure 2:
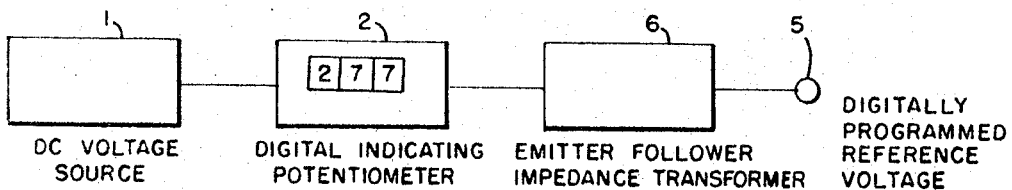
FIGURE 2 is a block diagram of the present invention connected as a digitally programmed reference voltage.

In FIGURE 2 the same components, with some circuit changes which transform the comparison circuit 3 into an impedance transformer 6, become digitally programmed reference voltage source. Here the DC regulated voltage source 1 feeds the digital indicating potentiometer 2 thereby providing a digitally indicated voltage. This voltage if it were to be applied directly to an external circuit from the potentiometer would be rendered inaccurate by the impedance of most types of circuits. For example, if the potentiometer has a total resistance of 10,000 ohms, an external circuit drawing 10 microamperes at the mid-point of the potentiometer will cause an error of 1 percent in the output voltage. The same transistors used in the circuit of FIGURE 1 as a comparison circuit are used in FIGURE 2 as an emitter follower impedance transformer 6 providing an accurate by programmed output at terminal 5 which can be applied to a circuit having an impedance of the order of 100,000 ohms without causing an error of more than 0.1 percent in the output voltage. The actual improvement in loading tolerance is of the order of 50 times.

Figure 3:
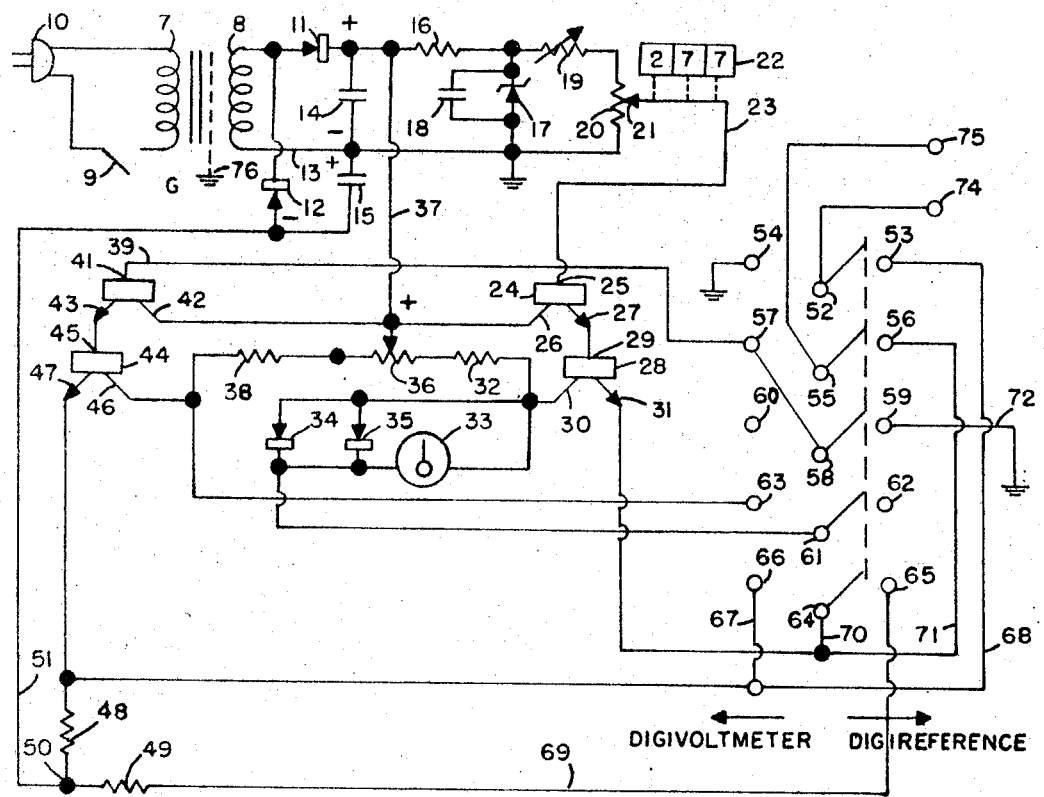
FIGURE 3 is a complete schematic circuit diagram of one form of the present invention.

FIGURE 3 is a complete schematic diagram of my combination digitally programmed reference voltage source and digital voltmeter. The DC source may be batteries or a line operated source including transformer 7–8, rectifiers 11–12 and filter capacitors 14–15. The primary 7 is connected through on-off switch 9 to plug 10 suitable for connection to an alternating current line, not shown. Line 13 may be considered the common side of the DC source and connected to the apparatus ground G. While any other suitable voltage may be chosen, the present circuit will be described an the basis of 10 volts maximum output as a reference voltage source or 10 volts maximum range as a voltmeter. The voltage from the DC source (or batteries) is regulated at approximately 11 volts by Zener diode 17 through dropping resistor 16. If necessary for hum reduction, a capacitor 18 is connected across Zener 17. A potentiometer having a precisely linear resistance as, for example, a precision 10 turn potentiometer 20 having an adjustable contact 21 is connected across Zener 17 through an adjustable series compensating resistor 19. Potentiometer 20–21 is turned by means of a digitally indicating dial 22. If potentiometer 20–21 has a total resistance of 10,000 ohms, resistor 19 when adjusted around 1,000 ohms, can be set to impress precisely 10 volts across the potentiometer. Now if the dial 22 is a three place digital dial, it will read volts in the first digit, of a volt in the second digit and hundredths of a volt in the third digit. As shown, dial 22 reads 2.77 volts.

The comparison follower circuit utilizes two transistors 28 and 44 and for added sensitivity and reduced driving current these two transistors are driven by transistors 24 and 40 connected in Darlington connection. The change over from comparison to follower and vice versa is made by a suitable switch such as the five pole, double throw switch 52 through 66. When thrown to the left, this switch provides the comparison circuit so that the system operates as a digital voltmeter, and when thrown to the right, this switch provides the emitter follower impedance transformer circuit and the system operates as a digitally programmed reference voltage source. First, the digital voltmeter operation will be described and the switch will be assumed to be thrown to the left closing contacts 52–54, 55–57, 58–60, 61–63 and 64–66.

The digital voltmeter operates by comparing an unknown voltage with the voltage across contact 21 to common through the transistor comparison circuit. Variable contact 21 is connected to base driver 25 of driver transistor 24 over lead 23. Positive voltage across capacitor 14 is supplied to the transistor circuit over lead 37. Collector 26 is connected to positive lead 37 and emitter 27 is connected to base 29. Collector 30 is connected through collector load resistor 32 to one end of balance potentiometer 36 and the adjustable contact of potentiometer 36 is connected to positve lead 37. Emitter 31 is connected over leads 67 and 70 through closed switch contacts 64–66 to emitter 47. The common emitter resistor 48 is returned to the negative voltage across filter capacitor 15 over lead 51 connected to junction 50. The unknown voltage to be measured is connected to terminals 74–75. The lower input terminal 74 is connected to apparatus ground G through closed switch contacts 52–54. The upper or high terminal 75 is connected through closed switch contacts 55–57 and thence over lead 39 to base 41 of driver transistor 40. Collector 42 is connected to positive lead 37 and emitter 43 is connected to base 45. Collector 46 is connected through collector load resistor 38. Balance indicator meter 33 is connected from collector 30 and through closed switch contacts 61–63 to collector 46. Reverse connected diodes 34 and 35 are placed across meter 33 to protect it from excessive voltage. With potentiometer arm 21 set to zero and input terminals 74–75 shorted, potentiometer 36 is adjusted to a point which causes meter 33 to read zero. A zero center meter is most convenient as meter 33. The transistor circuit described above is a so-called long-tailed pair and once balanced will provide a zero meter reading showing equal collector when base voltages are equal. To operate after the balance has been established, an unknown voltage to be measured is applied to input terminals 74–75 and potentiometer arm 21 is advanced until balance is reestablished as indicated by zero center reading on meter 33. The unknown input voltage is then read on digital dial 22. The Darlington driven long-tailed pair draws only a very small current from the external unknown voltage source and from the reference potentiometer. While NPN transistors have been shown and described, the circuit can be provided using PNP transistors by reversing all polarities.

The digitally programmed reference voltage is provided when switch 52 through 66 is thrown to the right closing contacts 52–53, 55–56, 58–59, 61–62 and 64–65. The transistor circuits are modified, meter 33 is disconnected, and emitters 31 and 47 are connected to separate resistors. Emitter 47 is connected to resistor 48 and emitter 31 is connected over leads 68, 70 and 69 through closed switch contacts 64–65 to resistor 49. Resistors 48 and 49 are joined at 50 and returned to the negative voltage across filter capacitor 15 over lead 51. The reference voltage potentiometer is connected to base 25 as before and base 41 is connected to apparatus ground G over lead 39, through closed switch contacts 58–59 and over leads 72 and 73. With these connections the voltage between emitters 31 and 47 will be accurately the voltage at potentiometer contact 21 as indicated by digital dial 22. This voltage is well regulated i.e. it appears across an effectively low impedance circuit. This regulated, accurately programmed, digitally indicated voltage is applied to output terminals 74 and 75 since emitter 47 is connected over lead 68, through closed switch contacts 52–53 to terminal 74 and emitter 31 is connected over lead 71, and through closed switch contacts 55–56 to terminal 75. Since this circuit is in effect "floating" good isolation and shielding is required. In the case of line voltage power operation good insulation between the primary 7 and secondary 8 is necessary and an electrostatic shield 76 is advantageous.

Figure 4:
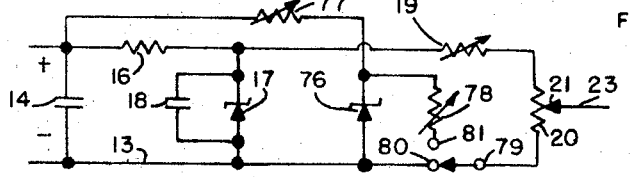
FIGURE 4 is a schematic circuit diagram of a modification of a portion of the circuit of my invention to provide a low voltage range.

FIGURE 4 shows a modification which provides an additional low voltage range with a minimum of additional components. The novel concept employed here is to utilize the difference between the voltages across two similar Zener diodes of slightly different Zener voltages. For example, if the primary range of the voltmeter/reference device is 10 volts derived from a voltage regulated by an 11 volt Zener, a second range of 1 volt can readily be obtained by adding a second Zener having a regulating voltage of the order of 9.5 volts. The difference voltage which is 1.5 volts is dropped by means of an adjustable calibrating resistor to impress exactly 1 volt across the ten turn programming potentiometer. The only additional components the are required are a dropping resistor for the second Zener and a double throw switch to affect the change over.

FIGURE 4 shows specifically the common portions of the circuit with the same designating numerals as shown in FIGURE 3. Only those components necessary for a clear understanding of the modification are shown since the balance of the circuit is essentially the same as for the single range voltmeter/reference voltage source. The second Zener 76 should have a Zener voltage less than the Zener voltage of Zener 17 as set forth above. Zener 76 is connected between negative line 13 and an adjustable dropping resistor 77 returning to the positive side of capacitor 14. A switch 79–80–81 is provided for switching the range. When the switch contacts 79–80 are closed, the device operates on its primary range as described in detail above in connection with FIGURE 3. When switch contacts 79–81 are closed the difference between the Zener voltages of Zener diodes 17 and 76 is applied to programming potentiometer 20 through adjustable calibrating resistors 19 and 78. Resistor 19 is adjusted for using the primary voltage range and resistor 78 is adjusted for applying a precise predetermined voltage across the programming potentiometer 20, for example exactly 1.0 volt. By providing an adjustable voltage dropping resistor 77, the current through Zener 76 can be adjusted so that the regulating characteristics of the two Zeners can be accurately matched. This provision can be used to balance these Zeners to a point where line voltage regulation is reduced to a vanishingly small quantity.

What is claimed is:

1. In an electronic voltmeter, the combination of, a source of DC reference voltage, a precision potentiometer, means for applying a predetermined voltage from said source across said potentiometer, a digital dial mechanically coupled to said potentiometer for directly indicating the voltage at the contact arm of said potentiometer, a zero center meter, means for comparing a voltage to be measured with the voltage at said contact arm to indicate zero on said meter when equality therebetween is established whereby current of the order of one microampere is drawn from said potentiometer and the voltage being measured and including a first pair of transistors, a pair of terminals, a two position multi-circuit switch, wherein said switch is adapted to connect said transistors as a long-tailed pair in one position providing high impedance input voltmeter capability in said combination and to connect said transistors as emitter follower impedance transformers in the second position providing reference voltage capability in said combination, said terminals providing input terminals for said voltmeter capability and output terminals for said reference voltage capability, said contact arm being movable in accordance with the voltmeter voltage and the reference voltage whereby voltmeter voltages and reference voltages are digitally indicated by said dial.

2. A digital reference/voltmeter as set forth in claim 1 and including further transistors connected in Darlington Configuration to said first pair of transistors for reducing the current required to actuate said combination.

3. A digital reference/voltmeter as set forth in claim 1, including a pair of reverse connected diodes connected across said meter for limiting the voltage across said meter.

4. A digital reference/voltmeter as set forth in claim 1, and including a balance potentiometer connected to said transistors for providing zero difference voltage at the collectors of said transistors.

5. A digital reference/voltmeter as set forth in claim 1, wherein said transistors are of the same type.

6. A digital reference/voltmeter as set forth in claim 1, and including collector resistors connected to said transistors and at least one emitter resistor connected to said transistors wherein the effective parallel resistance of said collector resistances is less than the effective emitter resistance of said transistors.

References Cited

UNITED STATES PATENTS

| | | | |
|---|---|---|---|
| 2,920,316 | 1/1960 | Cohen | 324—99 XR |
| 2,930,030 | 3/1960 | Hirose | 324—99 XR |
| 3,102,981 | 9/1963 | Pulliam | 324—98 |
| 3,262,066 | 7/1966 | Trilling | 330—30 XR |
| 3,284,709 | 11/1966 | De Paolo | 324—98 |
| 3,286,232 | 11/1966 | Stanford | 324—98 XR |
| 3,297,939 | 1/1967 | Dauphinee | 324—98 XR |
| 3,356,943 | 12/1967 | Wise | 324—99 XR |
| 3,356,944 | 12/1967 | Coon | 324—98 |

RUDOLPH V. ROLINEC, Primary Examiner

EARNEST F. KARLSEN, Assistant Examiner

U.S. Cl. X.R.

323—79